United States Patent Office 2,856,338
Patented Oct. 14, 1958

2,856,338

POLYMERIZATION OF N-VINYLLACTAMS

Frederick Grosser, North Plainfield, N. J., assignor to General Aniline & Film Corporation, New York, N. Y., a corporation of Delaware No Drawing. Application September 30, 1954
Serial No. 459,539

3 Claims. (Cl. 204—158)

This invention relates to an improved method of polymerizing N-vinyl-lactams; more particularly, an improved method for polymerizing N-vinyl-α-pyrrolidone.

The polymerization of N-vinyl-lactams, especially, N-vinyl-α-pyrrolidone, using peroxide catalysts, is disclosed in U. S. Patent 2,335,454, of November 30, 1943, to Schuster et al. It has heretofore been found in such peroxidic polymerization of such N-vinyl-lactams, that the polymerization is most readily carried out by incorporating a small amount of an amine or ammonia as an activator, along with the peroxide catalyst to an aqueous solution of the N-vinyl-lactam to be polymerized.

Since polymeric N-vinyl-α-pyrrolidone has thus far been found to be the most valuable of the polymeric N-vinyl-lactams, the present invention will be described with particular reference to the polymerization of monomeric N-vinyl-α-pyrrolidone. However, it is to be understood that the invention is applicable to the polymerization of N-vinyl-lactams as a class, including in addition to N-vinyl-α-pyrrolidone, N-vinyl-α-piperidone, N-vinyl-hexahydrophthalimidine and N-vinyl-caprolactam.

In the prior art, polymerization of N-vinyl-α-pyrrolidone has conventionally been accomplished by adding hydrogen peroxide, as catalyst, and ammonium hydroxide or an amine, as an activator, to an aqueous solution of monomeric N-vinyl-α-pyrrolidone, and heating the mixture. Temperatures of 25 to 100° C. have been used, with the preferred temperature range being 40 to 60° C. By this method, using a monomer of average purity, i. e., monomer obtained by one distillation of crude vinyl-pyrrolidone in a 5-plate vacuum still at about 80 percent reflux, it has been possible to obtain polymers having a K value, as defined by H. Fikentscher in "Cellulose Chemie," XIII, 58, 1932, in the range of 10 to 50, depending on the concentration of hydrogen peroxide. It has been found that the K value of the resulting polymer varies inversely to the concentration of catalyst, when other conditions remain the same. It has been possible to obtain polymers of higher K values than 50 by this prior art method only by using specially purified monomer, such as that obtained by careful redistillation, and by carrying out the polymerization of such specially purified monomer under conditions such that oxygen is rigidly excluded; i. e., oxygen-free distilled water must be used in preparing the solutions to be polymerized, and the polymerization must be carried out in an oxygen-free atmosphere, such as under a blanket of oxygen-free nitrogen.

Using such specially purified monomer and oxygen-free polymerization conditions, it is possible to reduce the catalyst concentration to a level such that polymers in the range of 50 to 90 K values are obtained. However, without such specially purified monomer and oxygen-free polymerization conditions, no polymerization occurred in the prior art process when the catalyst concentration was reduced to a level which would result in polymerization in the K values of 50 to 90; i. e., below the catalyst concentration at which polymers of about 50 K value were produced.

I have now found that it is possible to prepare polymers with K values in the range of 50 to 100, without the use of specially purified monomer and oxygen-free polymerization conditions, by using ultraviolet light as an auxiliary activator. It will be apparent that this improvement offers the following immediate advantages in the preparation of polymeric N-vinyl-pyrrolidone: (1) only one grade of monomer is necessary to prepare polymers over the entire K value range of 10 to 100; and no special purification of the monomer is required; (2) ordinary distilled water may be used in the polymerization without the necessity for the removal of oxygen; (3) no precautions to exclude oxygen from the reaction vessel are necessary, thus obviating the use of oxygen-free nitrogen, or any nitrogen; (4) in addition, polymerization takes place at a lower temperature than is possible without the use of ultraviolet light, so that external heating (or cooling) of the reaction mixture is unnecessary.

The details of the present invention will be apparent to those skilled in the art from a consideration of the following specific examples:

EXAMPLE A

Prior art polymerization

Aqueous solutions containing 30 percent of monomeric N-vinyl-α-pyrrolidone, which was all from the same batch of monomer and was average purity and obtained by one distillation of crude vinyl-pyrrolidone in a 5-plate vacuum still at about 80 percent reflux, were prepared in distilled water to which varying amounts of hydrogen peroxide had been added so that the amount of hydrogen peroxide, based on the amount of monomer, varied from 4.0 to 0.3 percent by weight of the monomer. The solutions also contained 2 percent of ammonium hydroxide, added as activator. The solutions were then heated at 50° C. until polymerization was complete (several hours). The K value of the resulting polymers varied from 13, when 4 percent hydrogen peroxide was used, to 47, when 0.3 percent hydrogen peroxide was used. When the concentration of the hydrogen peroxide was reduced below 0.3 percent, using the same monomer and polymerization conditions, no polymerization occurred. Efforts to induce polymerization with less than 0.3 percent hydrogen peroxide, by heating to higher temperatures; i. e., 75° C. were likewise unsuccessful.

EXAMPLE B

Thirty percent aqueous solutions of the same batch of monomeric N-vinyl-α-pyrrolidone, as that used in Example A, were then prepared, again using ordinary distilled water to which had been added an amount of hydrogen peroxide as catalyst varying from 0.6 percent to 0.006 percent, based on the weight of the monomer. The solutions contained 2 percent ammonium hydroxide as activator. The thus prepared solutions were then placed 6 to 10 inches below an ultraviolet light (Hanovia Analytic model #5C5010, equipped with a filter to transmit in the range 3100–4100A.). No heat was added to the reaction mixture. Moreover, polymerization occurred at such a rate that the temperature of the reaction mixture rose to only about 35° C. even though no external cooling was utilized. Polymerization occurred readily in the course of several hours and the resulting polymers ranged in K value from 32, when 0.6 percent hydrogen peroxide was used, to 100, when 0.006 percent hydrogen peroxide was used. The yield of polymeric material varied from 100 percent at 0.6 percent hydrogen peroxide concentration to 95 percent at 0.006 percent hydrogen peroxide concentration.

It will be apparent that the foregoing examples are illustrative of the present invention, and that modifications may be made therein without departing from the scope of the present invention. Thus, hydrogen peroxide is the preferred catalyst for the production of polymeric N-vinyl-α-pyrrolidone, since it does not introduce any foreign matter into the polymer. It will be apparent that other peroxide polymerization catalysts, such as potassium persulfate, benzoyl peroxide, sodium peroxide, and other organic and inorganic peroxidic polymerization catalysts are operative, and may be used, if desired, in place of hydrogen peroxide; especially, in applications where extreme purity of the polymer is not essential. It will also be apparent that, in place of ammonium hydroxide used as an activator in the foregoing examples, a small amount of a water-soluble amine of the type heretofore used in peroxidic polymerization of N-vinyl-α-pyrrolidone (e. g. monoethylamine triethylamine, tetramethyl ammonium hydroxide, ethanolamine and pyridine) may be employed as activator. It will also be understood that, while a 30 percent solution of N-vinyl-pyrrolidone represents a preferred concentration since it is readily handled, the concentration of the solution may be varied through a reasonably wide range without affecting the operativeness of the polymerization process; and, while critical limits for the concentration of the solution being polymerized have not been established, concentrations of from 60 percent to 5 percent have been used.

I claim:

1. The method of producing high polymers of N-vinyl-lactams having a K value of 50 to 100, which comprises subjecting to the action of ultraviolet light, an aqueous solution of an N-vinyl-lactam containing as the sole catalyst therefor a small amount of a peroxide polymerization catalyst and a minor amount of an activator selected from the group consisting of ammonium hydroxide and amines, the amount of peroxide polymerization catalyst employed being less than the minimum amount required to effect polymerization by heating said aqueous solution and the polymerization being effected without rigid exclusion of oxygen or redistillation of the monomer.

2. The method defined in claim 1 wherein the N-vinyl-lactam is N-vinyl-α-pyrrolidone.

3. The method as defined in claim 2 wherein the concentration of the N-vinyl-α-pyrrolidone in the aqueous solution thereof is about 30 percent, the polymerization catalyst is hydrogen peroxide, and the activator is ammonium hydroxide.

References Cited in the file of this patent

UNITED STATES PATENTS

| | | |
|---|---|---|
| 2,335,454 | Schuster et al. | Nov. 30, 1943 |
| 2,471,959 | Hunt | May 31, 1949 |
| 2,665,271 | Beller | Jan. 5, 1954 |